(12) United States Patent
Pan (10) Patent No.: US 7,584,545 B2
(45) Date of Patent: Sep. 8, 2009

(54) FLOATING SHEET ARTICLE THICKNESS DETECTING DEVICE

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 160 days.

(21) Appl. No.: 11/949,581

(22) Filed: Dec. 3, 2007

(65) Prior Publication Data
US 2009/0025239 A1    Jan. 29, 2009

(30) Foreign Application Priority Data
Jul. 27, 2007    (TW) .............................. 96127411 A (51) Int. Cl.
*B02C 18/22* (2006.01)
*B65H 7/02* (2006.01)
(52) U.S. Cl. .................. 33/501.02; 271/262; 241/101.3
(58) Field of Classification Search ............. 33/501.02, 33/501.03, 501.04; 271/262, 263; 241/101.3; 73/866
See application file for complete search history.

(56) References Cited

U.S. PATENT DOCUMENTS

| | | | | |
|---|---|---|---|---|
| 4,256,299 A | * | 3/1981 | Hogenson | 271/262 |
| 5,743,521 A | * | 4/1998 | Munakata et al. | 271/263 |
| 6,141,883 A | * | 11/2000 | Mitchell et al. | 33/501.02 |
| 6,983,934 B1 | * | 1/2006 | Knierim | 271/262 |
| 2007/0246586 A1 | * | 10/2007 | Matlin et al. | 241/101.3 |
| 2009/0032629 A1 | * | 2/2009 | Aries et al. | 241/236 |

FOREIGN PATENT DOCUMENTS

| | | | | |
|---|---|---|---|---|
| DE | 102006036136 A1 | * | 1/2008 | |
| GB | 2451301 A | * | 1/2009 | |
| JP | 2003251213 A | * | 9/2003 | |

* cited by examiner

*Primary Examiner*—R. A. Smith
(74) *Attorney, Agent, or Firm*—Kirton & McConkie; Evan R. Witt (57) ABSTRACT

A floating sheet article thickness detecting device for use in a sheet article processing mechanism includes two guiding slots, two glidable guide blocks, an elastic sustaining member and at least one thickness sensing module. The two glidable guide blocks are respectively embedded into the two guiding slots to render synchronous shift actions in the guiding slots. The elastic sustaining member includes a stationary sustaining element and a movable sustaining element. The stationary sustaining element and the movable sustaining element are separated when the sheet article passes therebetween, so that the movable sustaining element is subject to a thickness shift to form an elastic gap therebetween. The sheet article is fed into a sheet article feeding channel through the elastic gap. The thickness sensing module is synchronously moved with the thickness shift of the movable sustaining element according to the thickness of the sheet article, thereby generating a thickness detecting signal.

19 Claims, 4 Drawing Sheets

FLOATING SHEET ARTICLE THICKNESS DETECTING DEVICE

FIELD OF THE INVENTION

The present invention relates to a floating sheet article thickness detecting device, and more particularly to a floating sheet article thickness detecting device for use in a sheet article processing mechanism.

BACKGROUND OF THE INVENTION

Sheet articles such as papers, credit cards, photographs and the like are usually processed by processing mechanisms, for example paper shredding mechanisms, scanning mechanisms or film laminating mechanisms. In a case that the sheet articles are too thick or too thin, the processing mechanisms may fail to normally function. For example, if thickness of the sheet article exceeds the allowable specification of the processing mechanism, the sheet article is readily jammed or the processing operation is possibly interrupted. The obstacle is eliminated with difficulty by the users themselves. Otherwise, the processing mechanism needs to be returned to the depot service, which increases inconvenience.

Figure 1:
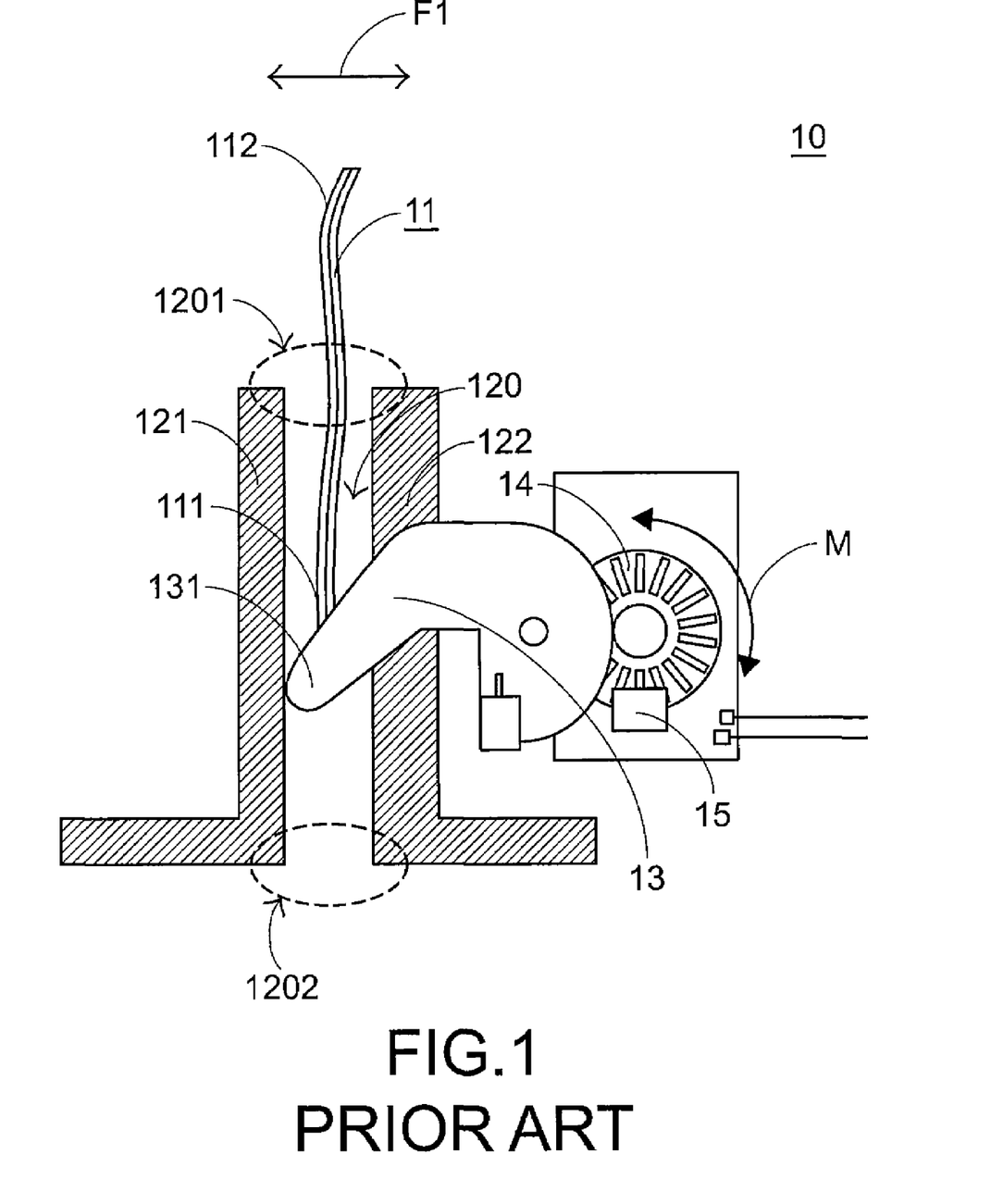
FIG. 1 is a schematic partial view of a paper shredding mechanism having a device for automatically detecting thickness of the sheet article according to the prior art.

For solving these problems, some approaches have been proposed. Take a conventional paper shredding mechanism for example. Referring to FIG. 1, a schematic partial view of a paper shredding mechanism having a device for automatically detecting thickness of the sheet article according to the prior art is illustrated. As shown in FIG. 1, the paper shredding mechanism 10 principally includes two guide plates 121, 122, an operating element 13, an optical grating wheel 14 and an optical sensing module 15. A paper feeding channel 120 is defined between the guide plates 121 and 122. After an article sheet 11 such as a paper is fed into the paper feeding channel 120 through the entrance 1201, the front edge 111 of the paper 11 is sustained against a protrusion 131 of the movable operating element 13. Next, the protrusion 131 of the movable operating element 13 is pressed down by the front edge 111 of the paper 11, and thus the optical grating wheel 14 is driven by the rear end of the operating element 13 to render a rotation M in either a forward or backward direction. The protrusion 131 is continuously sustained against the paper 11 until the rear edge 112 of the paper 11 is separated from the protrusion 131. Meanwhile, the operating element 13 is returned to its original position. By detecting rotation M of the optical grating wheel 14 and the rotational displacement thereof, the optical sensing module 15 may discriminate the thickness of the paper 11. In a case that the thickness lies within the acceptable range of the paper shredding mechanism 10, the paper shredding mechanism 10 maintains its normal operations. Whereas, in another case that the thickness of the sheet article exceeds the allowable specification of the processing mechanism, the follow-up processing operation (e.g. a paper shredding operation) will be interrupted.

The operation principles of the optical grating wheel 14, the optical sensing module 15 and the shredding operations are known in the art, and not redundantly described herein.

The paper shredding mechanism 10, however, still has some drawbacks. For example, when the front edge 111 of the paper 11 leaves the exit 1202 of the paper feeding channel 120, a shredding knife member, which is composed of for example two knifes arranged in a staggered form, starts a shredding operation. Under this circumstance, the rear edge 112 of the paper 11 is readily subject to a flapping effect. That is, the paper 11 is swung to the left and right sides in the direction F1.

Due to the flapping effect, the protrusion 131 is unstable if the rear edge 112 of the paper 11 has not been fully separated from the protrusion 131. As a consequence, the thickness of the paper 11 is often erroneously discriminated. In other words, even if the thickness lies within the acceptable range of the paper shredding mechanism 10, the thickness of the paper 11 may be erroneously discriminated due to the flapping effect of the rear edge 112 of the paper 11. Under this circumstance, the shredding operation of the paper shredding mechanism 10 is likely to be erroneously interrupted.

Figure 2:
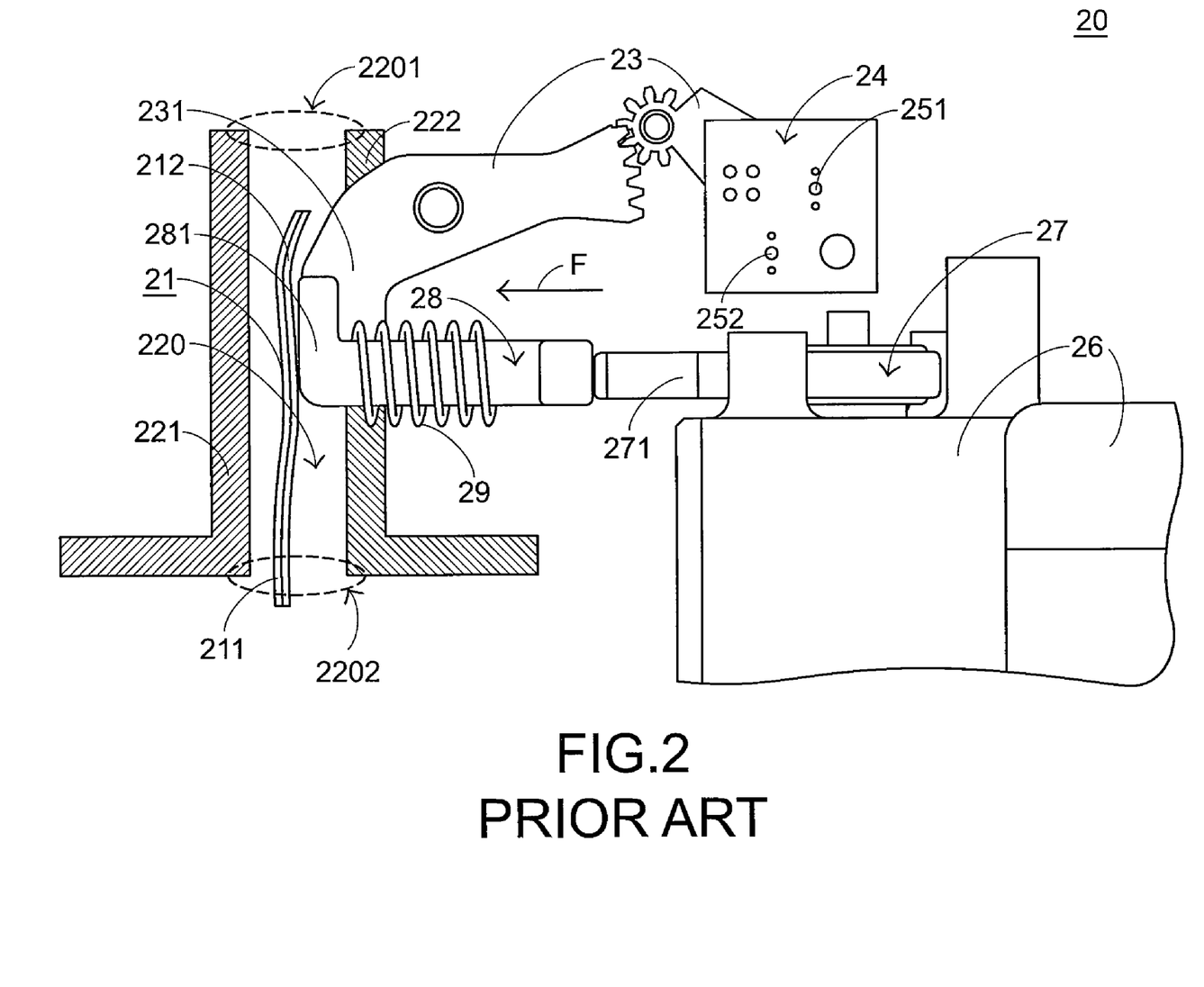
FIG. 2 is a schematic partial view of another paper shredding mechanism having a device for automatically detecting thickness of the sheet article according to the prior art.

For reducing the influence of the flapping effect, another paper shredding mechanism having a device for automatically detecting thickness of the sheet article is shown in FIG. 2. As shown in FIG. 2, the paper shredding mechanism 20 includes two guide plates 221, 222 and an operating element 23. A paper feeding channel 220 is defined between the guide plates 221 and 222. The thickness detecting device of FIG. 2 is distinguished from FIG. 1 by having two optical sensing modules 251 and 252. For clarification, only pins of these optical sensing modules 251 and 252 are shown in the drawings. The optical sensing modules 251 and 252 are fixed on a stationary plate 24. In addition, the light beams emitted from the optical sensing modules 251 and 252 may be sheltered by the operating element 23. During the paper 21 is transported across the paper feeding channel 220 from the entrance 2201 to the exit 2202, the paper 21 is sustained against the protrusion 231 of the operating element 23 such that the light beams from the optical sensing modules 251 and 252 are successively sheltered by the protrusion 231. Until these two optical sensing modules 251 and 252 are successively sheltered by the protrusion 231, the thickness of the paper 21 is deemed to exceed the acceptable range.

The operation principles of using the operating element 23 to shield these two optical sensing modules 251 and 252 are known in the art, and are not redundantly described herein.

There are some additional differences between the thickness detecting devices of FIG. 2 and FIG. 1. Please refer to FIG. 2 again. The paper shredding mechanism 20 further includes a cam 27, which is driven by a motor set 26. When the front edge 211 of the paper 21 leaves the exit 2202 of the paper feeding channel 220 and the shredding operation is started, the cam 27 is driven by the motor set 26 such that the protruding bar 271 of the cam 27 moves in the advancing direction F. Consequently, the push rod 28, which is sheathed by a spring 29, is pushed forward by the protruding bar 271 of the cam 27. The push rod 28 is continuously pushed forward by the protruding bar 271 of the cam 27 during the shredding operation of the front edge 211 of the paper 21 is performed. Even if the flapping effect is generated at this moment, the possibility of causing erroneous operation of the paper shredding mechanism 10 is reduced because the rear edge 212 of the paper 21 is no longer improperly sustained against the protrusion 231 of the operating element 23.

The paper shredding mechanism 20, however, still has some drawbacks. For example, the spring 29 is often suffered from elastic fatigue after used for a long term. That is, the reliability of the paper shredding mechanism 20 is gradually reduced as time has elapsed, and thus the paper 21 is likely to be improperly sustained against the operating element 23. Moreover, the paper shredding mechanism 20 of FIG. 2 is disadvantageous because it is not cost-effective and its structure is complicated. These disadvantages become hindrance from fabricating and commercializing the paper shredding mechanism 20.

SUMMARY OF THE INVENTION

An object of the present invention provides a floating sheet article thickness detecting device for use in a sheet article processing mechanism to alleviate the flapping effect during the sheet article is subject to a processing operation, thereby avoiding erroneous operation.

Another object of the present invention provides a floating sheet article thickness detecting device for use in a sheet article processing mechanism, in which the thickness detecting device is synchronously moved as the sheet article is shifted to the left and right sides.

In accordance with an aspect of the present invention, there is provided a floating sheet article thickness detecting device for use in a sheet article processing mechanism. The floating sheet article thickness detecting device includes two guiding slots, two glidable guide blocks, an elastic sustaining member and at least one thickness sensing module. The two guiding slots are respectively formed in two side plates of the sheet article processing mechanism. The two glidable guide blocks are respectively embedded into the two guiding slots to render synchronous shift actions in the guiding slots. The elastic sustaining member includes a first sustaining element and a second sustaining element, which are respectively stationary and movable, arranged between the two glidable guide blocks and elastically sustained against each other. The first sustaining element and the second sustaining element are separated when the sheet article passes therebetween, so that the movable second sustaining element is subject to a thickness shift to form an elastic gap between the first sustaining element and the second sustaining element. The sheet article is fed into a sheet article feeding channel through the elastic gap. The at least one thickness sensing module is disposed on a surface of one of the two glidable guide blocks and in the vicinity of the second sustaining element. The thickness sensing module is synchronously moved with the thickness shift of the second sustaining element according to the thickness of the sheet article, thereby generating a thickness detecting signal. A mobile gap is defined between each glidable guide block and a corresponding guiding slot, such that the synchronous shift actions of the glidable guide blocks are allowable in the guiding slots when a processing operation is performed on a front edge of the sheet article transporting through the sheet article feeding channel and a rear edge of the sheet article is subject to a flapping effect, thereby alleviating the influence of the flapping effect. In addition, enlargement of the flapping effect is limited by the guiding slots.

In an embodiment, the sheet article processing mechanism further includes a frame with a hollow portion, and the two guiding slots are arranged in the two side plates of the frame.

In an embodiment, the at least one thickness sensing module is fixed on an external surface of one of the two glidable guide blocks such that the at least one thickness sensing module is synchronously moved with the glidable guide block which is coupled thereto.

In an embodiment, the at least one thickness sensing module includes two thickness sensing modules, which are fixed on external surfaces of the two glidable guide blocks such that the two thickness sensing module are synchronously moved with the glidable guide blocks which are coupled thereto.

In an embodiment, the first sustaining element is a stationary circular rod and the second sustaining element is a movable circular rod parallel with and in the vicinity of the first stationary circular rod. The stationary circular rod penetrates through and is fixed in corresponding fixing holes of the glidable guide blocks such that a sustaining part of the stationary circular rod is sustained against a first surface of the sheet article. The movable circular rod movably penetrates through corresponding transverse gliding holes of the glidable guide blocks such that another sustaining part of the movable circular rod is sustained against a second surface of the sheet article.

In an embodiment, the sustaining parts of the stationary circular rod and the movable circular rod are substantially circular discs.

In an embodiment, the elastic sustaining member further includes at least one elastic element, which is arranged on the same surface of a side plate and between a first rod end of the stationary circular rod and a second rod end of the movable circular rod, such that the movable circular rod is subject to the thickness shift along the transverse gliding holes in response to a restoring force resulted from the elastic element.

In an embodiment, the elastic element is a coil spring, both ends of which are coupled between the first rod end of the stationary circular rod and the second rod end of the movable circular rod.

In an embodiment, the elastic sustaining member further includes two elastic elements, which are arranged on surfaces of the two side plates and between the first rod end of the stationary circular rod and the second rod end of the movable circular rod, such that the movable circular rod is subject to the thickness shift along the transverse gliding hole in response to restoring forces resulted from the two elastic element.

In an embodiment, the at least one thickness sensing module includes at least one additional elastic element, a triangular dial block and an optical sensing member. The at least one additional elastic element is arranged on a side of one of the two glidable guide blocks. The triangular dial block has a first terminal pivotally coupled to the side and an extension portion extended upwardly from the first terminal. The extension portion is successively sustained against the second rod end of the movable circular rod and the additional elastic element, such that a circular motion of the triangular dial block is rendered with the first terminal serving as a pivotal center in response to a restoring force resulted from the additional elastic element when the second rod end of the movable circular rod is sustained against the extension portion. The optical sensing member is arranged in the vicinity of a second terminal of the triangular dial block. A sensing light beam emitted from optical sensing member is penetrable through an aperture in the second terminal of the triangular dial block as the circular motion of the triangular dial block proceeds, thereby changing the voltage-level state of an output signal issued from the optical sensing member.

In an embodiment, the at least one thickness sensing module includes at least one additional elastic element, a triangular dial block and a triangular base. The at least one additional elastic element arranged on a side of one of the two glidable guide blocks. The triangular dial block has a first terminal pivotally coupled to the side and an extension portion extended upwardly from the first terminal. The extension portion is successively sustained against the second rod end of the movable circular rod and the additional elastic element, such that a circular motion of the triangular dial block is rendered with the first terminal serving as a pivotal center in response to a restoring force resulted from the additional elastic element when the second rod end of the movable circular rod is sustained against the extension portion. The triangular base has a central recess structure therein for receiving the triangular dial block therein. The first terminal of the triangular dial block is pivotally coupled to the triangular base by means of a bolt/nut assembly to have the triangular dial block received in the central recess structure, such that the triangular dial block and the triangular base are cooperatively formed as a capacitor, and the area of the triangular dial block overlapping the triangular base is changed as the circular motion of the triangular dial block proceeds, thereby exhibiting different capacitance values.

In an embodiment, the triangular dial block is an electrode plate, the triangular base further includes additional electrode plates at bilateral inner sides of the central recess structure, and each of the electrode plate and the additional electrode plates are coated with a Mylar layer.

In accordance with another aspect of the present invention, there is provided a sheet article processing mechanism. The sheet article processing mechanism includes a sheet article feeding channel, a frame, two glidable guide blocks, a stationary sustaining element, a movable sustaining element, at least one elastic element and at least one thickness sensing module. The frame has a hollow portion and is disposed in front of an entrance of the sheet article feeding channel for allowing a sheet article to be fed into the sheet article feeding channel through the hollow portion. The two glidable guide blocks are respectively embedded into two guiding slots in two side plates of the frame. The stationary sustaining element penetrates through and is fixed in corresponding fixing holes of the glidable guide blocks such that a sustaining part of the stationary sustaining element is sustained against a first surface of the sheet article. The movable sustaining element movably penetrates through corresponding transverse gliding holes of the glidable guide blocks such that another sustaining part of the movable sustaining element is sustained against a second surface of the sheet article. The at least one elastic element is arranged on the same surface of a side plate and between a first end of the stationary sustaining element and a second end of the movable sustaining element. The movable sustaining element is subject to a thickness shift along the transverse gliding holes by the elastic element, thereby clamping the sheet article of different thickness. The at least one thickness sensing module is disposed in the vicinity of the movable sustaining element. The thickness sensing module is synchronously moved with the thickness shift of the movable sustaining element, thereby generating a thickness detecting signal. A mobile gap is defined between each glidable guide block and a corresponding guiding slot, such that synchronous shift actions of the glidable guide blocks are allowable in the guiding slots when a processing operation is performed on a front edge of the sheet article transporting through the sheet article feeding channel and a rear edge of the sheet article is subject to a flapping effect, thereby alleviating the influence of the flapping effect. In addition, enlargement of the flapping effect is limited by the guiding slots.

In accordance with a further aspect of the present invention, there is provided a sheet article processing mechanism. The sheet article processing mechanism includes a main body, a floating clamp member and at least one thickness sensing module. The main body has a sheet article feeding channel allowing a sheet article to be fed thereinto. Two guiding slots are respectively formed in two side plates of the main body. The floating clamp member is used for clamping the sheet article and includes two glidable guide blocks at bilateral sides thereof to be respectively embedded into the two guiding slots. A mobile gap is defined between each glidable guide block and a corresponding guiding slot. The at least one thickness sensing module is disposed on a surface of one of the two glidable guide blocks and in the vicinity of the floating clamp member. The thickness sensing module is synchronously moved with a thickness shift of the floating clamp member according to the thickness of the sheet article, thereby generating a thickness detecting signal. A clamp force by the floating clamp member is greater than a flapping force resulted from a flapping effect of the sheet article and the flapping force is greater than a friction force generated by the glidable guide block, such that the sheet article is stably clamped within the floating clamp member and the two glidable guide blocks of the floating clamp member are synchronously moved in the mobile gap in response to the flapping force.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
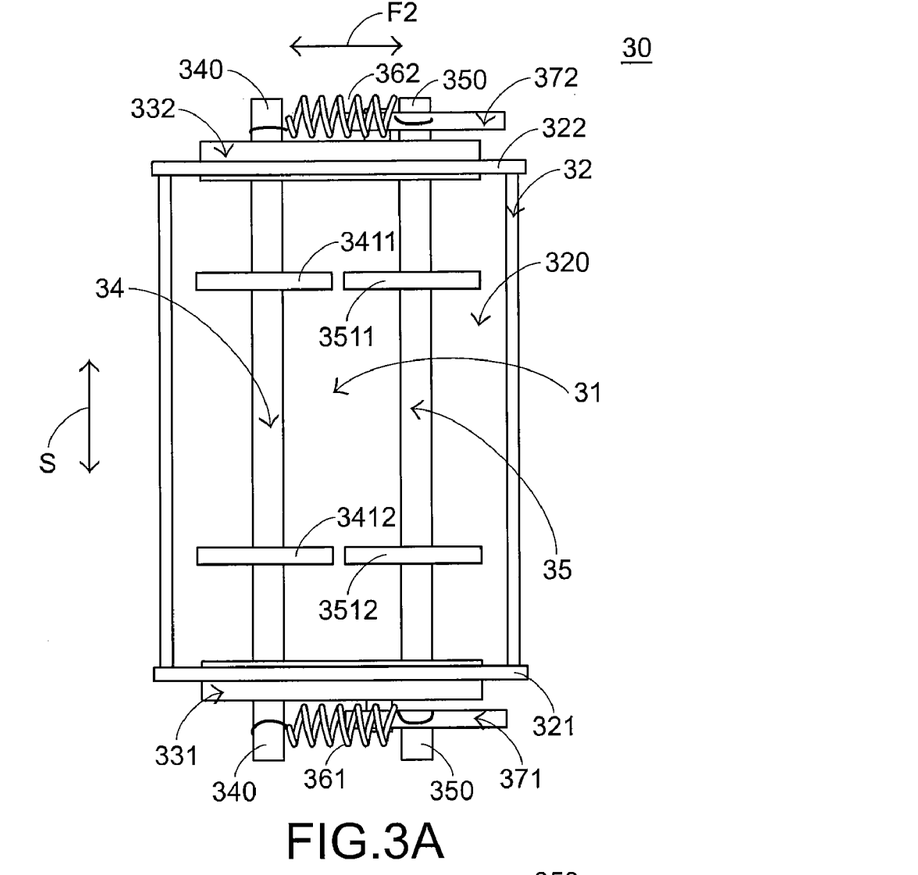
FIGS. 3(a) and 3(b) are respectively schematic top and side views of a sheet article processing mechanism according to a preferred embodiment of the present invention.
Figure 3B:
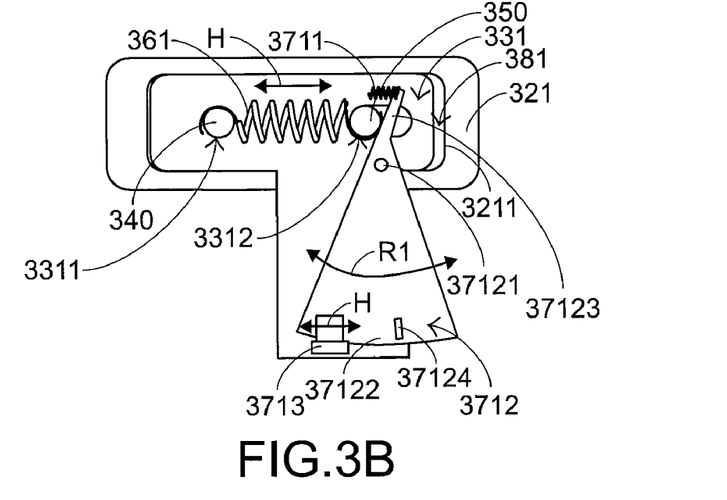

Pleas refer to FIGS. 3(a) and 3(b), which are respectively schematic top and side views of a sheet article processing mechanism according to a preferred embodiment of the present invention. The sheet article processing mechanism 30 as shown in FIG. 3(a) is for example a paper shredding mechanism or a film laminating mechanism. The sheet article processing mechanism 30 principally includes a sheet article feeding channel 31, a frame 32 with a hollow portion 320, two glidable guide blocks 331, 332, a stationary circular rod 34 with two sustaining parts 3411, 3412, a movable circular rod 35 with two sustaining parts 3511, 3512, two coil springs 361, 362, and two thickness sensing modules 371, 372.

The frame 32 is disposed in front of the entrance of the sheet article feeding channel 31. A sheet article such as a paper (not shown) can be fed into the channel 31 through the hollow portion 320 of the frame 32. These two glidable guide blocks 331 and 332 are embedded into and pivotally arranged in respective guiding slots of two opposite side plates 321 and 322. The stationary circular rod 34 penetrates through and is fixed in corresponding fixing holes of the glidable guide blocks 331 and 332 such that the sustaining parts 3411 and 3412 are sustained against a first surface of the sheet article. The movable circular rod 35 movably penetrates through corresponding transverse gliding holes of the glidable guide blocks 331 and 332 such that the sustaining parts 3511 and 3512 of the movable circular rod 35 are sustained against an opposite surface (i.e. a second surface) of the sheet article. In FIG. 3(b), only the guiding slot 3211 of the side plate 321 and the fixing hole 3311 and the transverse gliding hole 3312 of the glidable guide block 331 are shown. Since the guiding slot of the side plate 322 and the fixing hole and the transverse gliding hole of the glidable guide block 332 are disposed at the locations corresponding to the guiding slot 3211, the fixing hole 3311 and the transverse gliding hole 3312, and are not shown in the drawings for brevity.

The coil springs 361 and 362 are arranged on external surfaces of the side plates 321 and 322, respectively. The coil spring 361 is interconnected between a rod end 340 of the stationary circular rod 34 and a rod end 350 of the movable circular rod 35. Likewise, the coil spring 362 is interconnected between the other rod end 340 of the stationary circular rod 34 and the other rod end 350 of the movable circular rod 35. By means of the coil spring 362, the movable circular rod 35 may be subject to a thickness shift along the transverse gliding hole 3312 of the glidable guide block 331 in order to adaptively clamp the sheet article according to the thickness of the sheet article. The thickness sensing modules 371 and 372 are disposed in the vicinity of the two rod ends 350 of the movable circular rod 35, respectively. In response to the thickness shift of the movable circular rod 35, the thickness sensing modules 371 and 372 are triggered to generate a thickness detecting signal. The operation principles of the thickness sensing modules 371 and 372 will be described later.

In accordance with a feature of the present invention, there is a mobile gap 381 between the glidable guide block 331 and the corresponding guiding slot, as can been in FIG. 3(b). Likewise, there is another mobile gap between the glidable guide block 332 and the corresponding guiding slot. As previously described, during a shredding operation or a film laminating operation is performed on the front edge of the sheet article, the rear edge of the sheet article is readily subject to a flapping effect. Due to the flapping effect, the sheet article is swung to the left and right sides in the direction F2 as shown in FIG. 3(a). The glidable guide blocks 331 and 332 are moved in the guiding slots by synchronous shift actions H, thereby alleviating the influence of the flapping effect. Moreover, the guiding slots may limit enlargement of the flapping effect.

Since these two thickness sensing modules 371 and 372 are respectively fixed on the glidable guide blocks 331 and 332, the thickness sensing modules 371 and 372 are synchronously moved with the synchronous shift actions H of the glidable guide blocks 331 and 332 in the guiding slots.

Please refer to FIG. 3(a) again. In accordance with another feature of the present invention, the clamp force (Fa) generated between the stationary circular rod 34 having two sustaining parts 3411, 3412 and the movable circular rod 35 having two sustaining parts 3511, 3512 and exerted on the sheet article is greater than the flapping force (Fb) resulted from the flapping effect F2. Moreover, the flapping force (Fb) is greater than the friction force (Fc) generated by the glidable guide block 331 or 332. Under this circumstance, the sheet article is securely clamped by the stationary circular rod 34 and the movable circular rod 35 while alleviating the influence of the flapping effect by rendering the synchronous shift actions H of the glidable guide blocks 331 and 332 in the guiding slots.

The sustaining parts 3411, 3412, 3511 and 3512 as shown in FIG. 3(a) are substantially circular discs. It is noted that, however, those skilled in the art will readily observe that numerous modifications and alterations of the sustaining parts may be made while retaining the teachings of the invention. For example, each of the stationary circular rod 34 and the movable circular rod 35 may have only one sustaining part in the middle thereof. Alternatively, each of the stationary circular rod 34 and the movable circular rod 35 may have more than two sustaining parts. Accordingly, the above disclosure should be limited only by the bounds of the following claims.

Please refer to FIG. 3(a) again. It is found that the sheet article is possibly subject to a swing effect in the horizontal direction S during a shredding operation or a film laminating operation is performed on the sheet article. The swing effect will be alleviated if the sustaining parts 3411, 3412, 3511 and 3512 are substantially circular discs as shown in FIG. 3(a).

Hereinafter, the thickness sensing modules 371 and 372 of the first preferred embodiment will be described in more details. Take the thickness sensing module 371 for example. The thickness sensing module 371 includes a coil spring 3711, a triangular dial block 3712 and an optical sensing member 3713. The coil spring 3711 is fixed on a side of the glidable guide block 331. A first terminal 37121 of the triangular dial block 3712 is pivotally coupled to the side of the glidable guide block 331. In addition, an extension portion 37123 is extended upwardly from the first terminal 37121 such that the extension portion 37123 is successively sustained against the rod end 350 of the movable circular rod 35 and the coil spring 3711. In response to the restoring force resulted from the coil spring 3711, a circular motion R1 of the triangular dial block 3712 with the first terminal 37121 serving as the pivotal center is rendered when the rod end 350 of the movable circular rod 35 is sustained against the extension portion 37123. As shown in FIG. 3(b), the optical sensing member 3713 is arranged in the vicinity of the second terminal 37122 of the triangular dial block 3712. As the circular motion R1 of the triangular dial block 3712 proceeds, a sensing light beam (not shown) emitted from the optical sensing member 3713 is penetrable through an aperture 37124 in the second terminal 37122 of the triangular dial block 3712. Meanwhile, the output signal issued from the optical sensing member 3713 is switched from a low-level state to a high-level state.

Figure 4A:
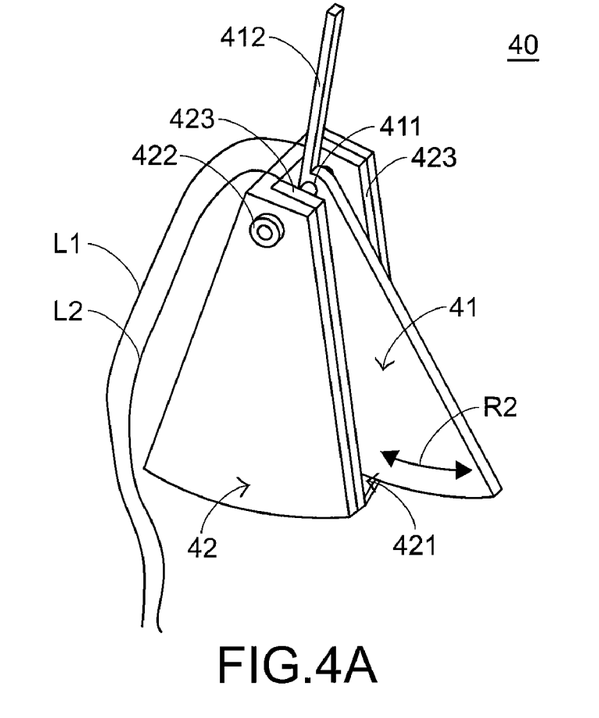
FIGS. 4(a) and 4(b) are respectively schematic perspective and side views illustrating another embodiment of the thickness sensing module of FIG. 3.

A further embodiment of the thickness sensing module is illustrated in FIG. 4(a). Please refer to FIG. 4(a) and also FIGS. 3(a) and 3(b). The thickness sensing module also includes a coil spring (not shown), a triangular dial block 41 and a triangular base 42 having a central recess structure 421. Like the coil spring 3711 of FIG. 3(b), the coil spring of this embodiment is fixed on a side of the glidable guide block 331. A first terminal 411 of the triangular dial block 41 is pivotally coupled to the side of the glidable guide block 331. In addition, an extension portion 412 is extended upwardly from the first terminal 411 such that the extension portion 412 is successively sustained against the rod end 350 of the movable circular rod 35 and the coil spring. In response to the restoring force resulted from the coil spring, a circular motion R2 of the triangular dial block 41 with the first terminal 411 serving as the pivotal center is rendered when the rod end 350 of the movable circular rod 35 is sustained against the extension portion 412. Moreover, the triangular dial block 41 is received in the central recess structure 421 of the triangular base 42. By means of a bolt/nut assembly 422, the first terminal 411 is pivotally received in the central recess structure 421. As a consequence, the triangular dial block 41 and the triangular base 42 are cooperatively formed as a capacitor. As the circular motion R2 of the triangular dial block 41 proceeds, the area of the triangular dial block 41 overlapping the triangular base 42 is changed such that the capacitance value of the capacitor is adjustable.

Figure 4B:
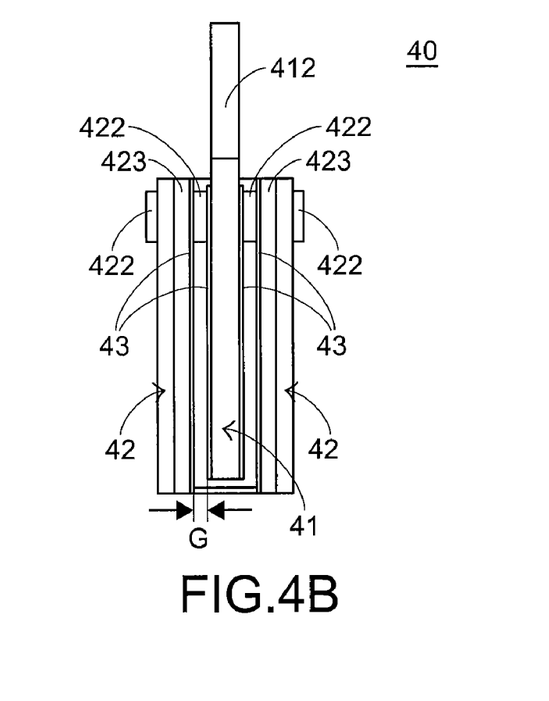

Referring to FIG. 4(b), a schematic side view of the thickness sensing module of FIG. 4(a) is illustrated. In this embodiment, the triangular dial block 41 is an electrode plate and the triangular base 42 further includes other electrode plates 423 at bilateral inner sides of the central recess structure 421. As shown in FIG. 4(b), the surfaces of these electrode plates are coated with a Mylar layer 43. As a consequence, an air gap G is formed between the surface of the triangular dial block 41 and a corresponding Mylar layer 43 on the inner surface of the electrode plate 423 of the triangular base 42. As a consequence, the triangular dial block 41 and the triangular base 42 are cooperatively formed as a capacitor. After the triangular dial block 41 (i.e. an electrode plate) and the electrode plate 423 of the triangular base 42 are connected to conductive wires L1 and L2, respectively, the capacitance value may be measured. By measuring change of the capacitance value, the thickness of the sheet article is realized.

It is noted that, however, those skilled in the art will readily observe that numerous modifications and alterations of the thickness sensing modules may be made while retaining the teachings of the invention. For example, the triangular dial block 3712 of FIG. 3(a) may be replaced by two linkages (not shown) of higher magnification. Accordingly, the above disclosure should be limited only by the bounds of the following claims.

From the above description, the floating sheet article thickness detecting device of the present invention of the present invention can alleviate the flapping effect or the swing effect during the sheet article is subject to a processing operation, thereby avoiding erroneous operation. Moreover, the thickness detecting device is synchronously moved as the sheet article is shifted to the left and right sides in order to adaptively clamp the sheet article according to the thickness of the sheet article.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A floating sheet article thickness detecting device for use in a sheet article processing mechanism, said floating sheet article thickness detecting device comprising:

two guiding slots respectively formed in two side plates of said sheet article processing mechanism;

two glidable guide blocks respectively embedded into said two guiding slots to render synchronous shift actions in said guiding slots;

an elastic sustaining member including a first sustaining element and a second sustaining element, which are respectively stationary and movable, arranged between said two glidable guide blocks and elastically sustained against each other, wherein said first sustaining element and said second sustaining element are separated when said sheet article passes therebetween, so that said movable second sustaining element is subject to a thickness shift to form an elastic gap between said first sustaining element and said second sustaining element, said sheet article being fed into a sheet article feeding channel through said elastic gap; and at least one thickness sensing module disposed on a surface of one of said two glidable guide blocks and in the vicinity of said second sustaining element, wherein said thickness sensing module is synchronously moved with said thickness shift of said second sustaining element according to the thickness of said sheet article, thereby generating a thickness detecting signal, wherein a mobile gap is defined between each glidable guide block and the corresponding guiding slot, such that said synchronous shift actions of said glidable guide blocks are allowable in said guiding slots when a processing operation is performed on a front edge of said sheet article transporting through said sheet article feeding channel and a rear edge of said sheet article is subject to a flapping effect, thereby alleviating the influence of said flapping effect, and enlargement of said flapping effect is limited by said guiding slots.

2. The floating sheet article thickness detecting device according to claim 1 wherein said sheet article processing mechanism further includes a frame with a hollow portion, and said two guiding slots are arranged in said two side plates of said frame.

3. The floating sheet article thickness detecting device according to claim 1 wherein said at least one thickness sensing module is fixed on an external surface of one of said two glidable guide blocks such that said at least one thickness sensing module is synchronously moved with said glidable guide block which is coupled thereto.

4. The floating sheet article thickness detecting device according to claim 3 wherein said at least one thickness sensing module includes two thickness sensing modules, which are fixed on external surfaces of said two glidable guide blocks such that said two thickness sensing module are synchronously moved with said glidable guide blocks which are coupled thereto.

5. The floating sheet article thickness detecting device according to claim 1 wherein said first sustaining element is a stationary circular rod and said second sustaining element is a movable circular rod parallel with and in the vicinity of said first stationary circular rod, wherein said stationary circular rod penetrates through and is fixed in corresponding fixing holes of said glidable guide blocks such that a sustaining part of said stationary circular rod is sustained against a first surface of said sheet article, and said movable circular rod movably penetrates through corresponding transverse gliding holes of said glidable guide blocks such that another sustaining part of said movable circular rod is sustained against a second surface of said sheet article.

6. The floating sheet article thickness detecting device according to claim 5 wherein said sustaining parts of said stationary circular rod and said movable circular rod are substantially circular discs.

7. The floating sheet article thickness detecting device according to claim 5 wherein said elastic sustaining member further includes at least one elastic element, which is arranged on the same surface of a side plate and between a first rod end of said stationary circular rod and a second rod end of said movable circular rod, such that said movable circular rod is subject to said thickness shift along said transverse gliding holes in response to a restoring force resulted from said elastic element.

8. The floating sheet article thickness detecting device according to claim 7 wherein said elastic element is a coil spring, both ends of which are coupled between said first rod end of said stationary circular rod and said second rod end of said movable circular rod.

9. The floating sheet article thickness detecting device according to claim 7 wherein said elastic sustaining member further includes two elastic elements, which are arranged on surfaces of said two side plates and between said first rod end of said stationary circular rod and said second rod end of said movable circular rod, such that said movable circular rod is subject to said thickness shift along said transverse gliding hole in response to restoring forces resulted from said two elastic element.

10. The floating sheet article thickness detecting device according to claim 7 wherein said at least one thickness sensing module includes:
- at least one additional elastic element arranged on a side of one of said two glidable guide blocks;
- a triangular dial block having a first terminal pivotally coupled to said side and an extension portion extended upwardly from said first terminal, wherein said extension portion is successively sustained against said second rod end of said movable circular rod and said additional elastic element, such that a circular motion of said triangular dial block is rendered with said first terminal serving as a pivotal center in response to a restoring force resulted from said additional elastic element when said second rod end of said movable circular rod is sustained against said extension portion; and
- an optical sensing member arranged in the vicinity of a second terminal of said triangular dial block, wherein a sensing light beam emitted from the optical sensing member is penetrable through an aperture in said second terminal of said triangular dial block as said circular motion of said triangular dial block proceeds, thereby changing the voltage-level state of an output signal issued from said optical sensing member.

11. The floating sheet article thickness detecting device according to claim 7 wherein said at least one thickness sensing module includes:
- at least one additional elastic element arranged on a side of one of said two glidable guide blocks;
- a triangular dial block having a first terminal pivotally coupled to said side and an extension portion extended upwardly from said first terminal, wherein said extension portion is successively sustained against said second rod end of said movable circular rod and said additional elastic element, such that a circular motion of said triangular dial block is rendered with said first terminal serving as a pivotal center in response to a restoring force resulted from said additional elastic element when said second rod end of said movable circular rod is sustained against said extension portion; and
- a triangular base having a central recess structure therein for receiving said triangular dial block therein, wherein said first terminal of said triangular dial block is pivotally coupled to said triangular base by means of a bolt/nut assembly to have said triangular dial block received in said central recess structure, such that said triangular dial block and said triangular base are cooperatively formed as a capacitor, and the area of said triangular dial block overlapping said triangular base is changed as said circular motion of said triangular dial block proceeds, thereby exhibiting different capacitance values.

12. The floating sheet article thickness detecting device according to claim 11 wherein said triangular dial block is an electrode plate, said triangular base further includes additional electrode plates at bilateral inner sides of said central recess structure, and each of said electrode plate and said additional electrode plates are coated with a Mylar layer.

13. A sheet article processing mechanism comprising:
- a sheet article feeding channel;
- a frame having a hollow portion and disposed in front of an entrance of said sheet article feeding channel for allowing a sheet article to be fed into said sheet article feeding channel through said hollow portion;
- two glidable guide blocks respectively embedded into two guiding slots in two side plates of said frame;
- a stationary sustaining element penetrating through and fixed in corresponding fixing holes of said glidable guide blocks such that a sustaining part of said stationary sustaining element is sustained against a first surface of said sheet article;
- a movable sustaining element movably penetrating through corresponding transverse gliding holes of said glidable guide blocks such that another sustaining part of said movable sustaining element is sustained against a second surface of said sheet article;
- at least one elastic element arranged on the same surface of a side plate and between a first end of said stationary sustaining element and a second end of said movable sustaining element, wherein said movable sustaining element is subject to a thickness shift along said transverse gliding holes by said elastic element, thereby clamping said sheet article of different thickness; and
- at least one thickness sensing module disposed in the vicinity of said movable sustaining element, wherein said thickness sensing module is synchronously moved with said thickness shift of said movable sustaining element, thereby generating a thickness detecting signal,
wherein a mobile gap is defined between each glidable guide block and the corresponding guiding slot, such that synchronous shift actions of said glidable guide blocks are allowable in said guiding slots when a processing operation is performed on a front edge of said sheet article transporting through said sheet article feeding channel and a rear edge of said sheet article is subject to a flapping effect, thereby alleviating the influence of said flapping effect, and enlargement of said flapping effect is limited by said guiding slots.

14. The sheet article processing mechanism according to claim 13 wherein said at least one thickness sensing module includes:
- at least one additional elastic element arranged on a side of one of said two glidable guide blocks;
- a triangular dial block having a first terminal pivotally coupled to said side and an extension portion extended upwardly from said first terminal, wherein said extension portion is successively sustained against said second end of said movable sustaining element and said additional elastic element, such that a circular motion of said triangular dial block is rendered with said first terminal serving as a pivotal center in response to a restoring force resulted from said additional elastic element when said second end of said movable sustaining element is sustained against said extension portion; and
- an optical sensing member arranged in the vicinity of a second terminal of said triangular dial block, wherein a sensing light beam emitted from optical sensing member is penetrable through an aperture in said second terminal of said triangular dial block as said circular motion of said triangular dial block proceeds, thereby changing the voltage-level state of an output signal issued from said optical sensing member.

15. The sheet article processing mechanism according to claim 13 wherein said at least one thickness sensing module includes:
- at least one additional elastic element arranged on a side of one of said two glidable guide blocks;
- a triangular dial block having a first terminal pivotally coupled to said side and an extension portion extended upwardly from said first terminal, wherein said extension portion is successively sustained against said second end of said movable sustaining element and said additional elastic element, such that a circular motion of said triangular dial block is rendered with said first terminal serving as a pivotal center in response to a restoring force resulted from said additional elastic element when said second end of said movable sustaining element is sustained against said extension portion; and a triangular base having a central recess structure therein for receiving said triangular dial block therein, wherein said first terminal of said triangular dial block is pivotally coupled to said triangular base by means of a bolt/nut assembly to have said triangular dial block received in said central recess structure, such that said triangular dial block and said triangular base are cooperatively formed as a capacitor, and the area of said triangular dial block overlapping said triangular base is changed as said circular motion of said triangular dial block proceeds, thereby exhibiting different capacitance values.

16. The sheet article processing mechanism according to claim 13 wherein said sustaining parts of said stationary sustaining element and said movable sustaining element are substantially circular discs.

17. A sheet article processing mechanism comprising:

a main body having a sheet article feeding channel allowing a sheet article to be fed thereinto, wherein two guiding slots are respectively formed in two side plates of said main body;

a floating clamp member for clamping said sheet article and including two glidable guide blocks at bilateral sides thereof to be respectively embedded into said two guiding slots, wherein a mobile gap is defined between each glidable guide block and the corresponding guiding slot;

at least one thickness sensing module disposed on a surface of one of said two glidable guide blocks and in the vicinity of said floating clamp member, wherein said thickness sensing module is synchronously moved with a thickness shift of said floating clamp member according to the thickness of said sheet article, thereby generating a thickness detecting signal, and wherein a clamp force by said floating clamp member is greater than a flapping force resulted from a flapping effect of said sheet article and said flapping force is greater than a friction force generated by said glidable guide block, such that said sheet article is stably clamped within said floating clamp member and said two glidable guide blocks of said floating clamp member are synchronously moved in said mobile gap in response to said flapping force.

18. The sheet article processing mechanism according to claim 17 wherein said floating clamp member further includes a first sustaining element and a second sustaining element, which are respectively stationary and movable, arranged between said two glidable guide blocks and elastically sustained against each other, wherein said first sustaining element and said second sustaining element are separated when said sheet article passes therebetween, so that said movable second sustaining element is subject to a thickness shift to form an elastic gap between said first sustaining element and said second sustaining element, said sheet article being fed into a sheet article feeding channel through said elastic gap.

19. The sheet article processing mechanism according to claim 17 wherein said at least one thickness sensing module is disposed in the vicinity of said second sustaining element.

* * * * *